UNITED STATES PATENT OFFICE.

MARC W. BEYLIKGY, OF TENAFLY, NEW JERSEY.

PROCESS OF MAKING ALKALINE BICHROMATES.

SPECIFICATION forming part of Letters Patent No. 539,029, dated May 14, 1895.

Application filed February 28, 1894. Serial No. 501,754. (No specimens.)

*To all whom it may concern:*

Be it known that I, MARC W. BEYLIKGY, a citizen of the United States, residing in Tenafly, in the county of Bergen and State of New Jersey, have invented a new and Improved Process of Manufacturing Alkaline Bichromates, of which the following is a specification.

My invention particularly relates to the manufacture of the bichromates of potash and soda and the object of my improvements is to provide a simple and economical process of producing those bichromates of a quality suitable for use in the arts. To this end I first produce a double chromate of lime and the alkali, whether soda or potash, to be bichromated, which I accomplish by roasting a mixture of chrome iron ore, lime and an oxygenated compound of the radical metal of the alkali, of proper proportions. For this purpose, having finely ground the chrome ore and alkaline salt and intimately mixed them with lime, I preferably form the mass into bricks, and then roast in any suitable form of furnace to which air may be freely admitted.

The proper proportions of the materials to be employed will vary with the varying percentages of sesquioxid of chromium in the chrome ore and of alkali in the salt thereof used. In general terms I mix them in such proportions that for every molecule of sesquioxid of chromium, there shall be present two atoms of the alkaline metal and enough lime (either hydrate or carbonate) to form a normal silicate of lime with such silicic acid as may enter the mixture from the chrome ore and alkaline salt and also one equivalent of lime extra to form in conjunction with the sesquioxid of chromium and the alkali the double chromate desired. In case the acid in combination with the alkali is such as forms a stable compound with lime at high temperature (*e. g.*, sulfate) the amount of lime that will thus enter into combination must also be allowed for. To the aggregate amount of lime thus provided for I preferably add not less than five per cent. of overdose in order to facilitate the reactions and subsequent lixiviation.

The exact amount and proportions of the materials to be used in any given case may be determined by experiment or may be readily calculated as will be well understood by those skilled in the art.

While ordinarily either hydrate or carbonate of lime may be employed the carbonate should be used when a carbonate of the alkali is employed so as to prevent the formation of a caustic alkaline hydrate which would be volatile at a low red heat when exposed to a current of air.

In performing the roast the temperature should, in order to prevent loss of the alkali, be first gradually raised to about the melting point of silver and so maintained for a time until the neutral chromate of the alkali under treatment is wholly formed. It should then be raised to a bright orange and be kept at this point as nearly as may be, until the reaction is completed. This is indicated first by the reddish yellow color assumed by the mass and by its becoming agglutinated and rendered compact or by some appropriate chemical test as when upon digesting the roasted material simply and repeatedly with strong hydrochloric acid in great excess, no blackish residue can be perceived. The roasting is then discontinued and the resulting double chromate of lime and the alkali under treatment, which is readily soluble in water, is separated from the other products of calcination by lixiviation. The next step of the process is the elimination of the lime from the solution thus obtained so as to obtain in solution bichromate of potash or soda as the case may be. This may be accomplished in various ways. I have found that a desirable method is to treat the double chromate solution with an insoluble fatty acid, such as ordinary commercial oleic acid. For this purpose I may prepare a coarse filter of absorbent material, which is proof against the action of diluted acids, such as ordinary cotton waste or woolen flocks. This is impregnated with the fatty acid and the double chromate solution is then allowed to pass slowly through it, so as to come thoroughly into contact with the fatty acid in the filter. The lime constituent of the double chromate combines with the fatty acid in preference to the alkaline constituent forming a calcareous soap, which is insoluble in the accompanying menstruum, which consists of bichromate of the alkali under treatment dissolved, which may then be drawn directly from the filter to evaporating pans or tanks and concentrated to recover the bichromate in solid form.

The insoluble fatty acids while powerful enough to abstract from normal chromates, the portion of basic element that renders them neutral, will not go beyond this limit so as to set free any chromic acid, no matter how largely they may be in excess, so that the lime is neatly separated from the bichromate formed without loss of the latter, and remains in the filter together with any excess of fatty acid left unacted upon. After the bichromate solution is withdrawn from the filter, the filter is washed with water to remove any adherent bichromate and then treated with dilute hydrochloric acid, which decomposes the calcareous soap forming a soluble calcium chlorid which may then be washed out with free affusion of water, the fatty acid being thus regenerated and remaining in the filter by virtue of the capillary attraction of the fibrous substances composing it. The filter is then ready for the passage of the next batch of lixiviate.

The calcium chlorid solution produced may be allowed to run to waste, or, in case sulfuric acid can be obtained more cheaply than hydrochloric acid, it may be collected in tanks and treated with sulfuric acid rather less in amount than would be required for the entire decomposition of the calcium chlorid. Upon this treatment the lime removed from the filtering apparatus will subside in the form of very sparingly soluble calcium sulfate and leave the hydrochloric acid in its original state of activity, ready to be again used in the removal of lime.

The words "alkali" and "alkaline" as used herein do not refer to the lime employed, but include only that alkali whether potash or soda, the bichromate of which is to be formed.

Any of the oxygenated compounds of potassium or sodium may be used for the purpose hereinbefore specified. I prefer, however, on account of their cheapness to use either a potash or soda feldspar or the sulfate of potash or soda as the case may be. Where a feldspar is used in which both potash and soda occur the two bichromates may be produced at one operation, since the bichromate of soda on account of its greater solubility, will remain in solution after the bichromate of potash is crystallized out and may be recovered separately by further evaporation of the mother liquor of crystallization.

The advantages of my invention will be readily apparent since by using a double chromate of lime and the alkali instead of a simple chromate as in the processes now in use, I enable the bichromate to be produced and recovered more neatly and economically than has heretofore been possible. Thus low grade chrome ores can be used as conveniently as those of high grade. The alkali is derived from the cheapest sources, no alkali auxiliary to the operation is wasted, the consumption of sulfuric acid is reduced to a minimum, there is no chance of error in the process of acidification, the bichromate is obtained pure in the first crystallization and no part of the product is wasted in the mother liquor, advantages not presented by any process heretofore known.

What I claim as new, and desire to secure by Letters Patent, is—

1. The hereinbefore described process of manufacturing the bichromates of potash and soda which consists in roasting together chrome iron ore, lime and an oxygenated compound of the radical metal of the alkali to be bichromated in such proportions and at such a temperature as to produce a double chromate of lime and such alkali, separating such double chromate from the other products of calcination by lixiviation and finally passing the lixiviate through a filter saturated with an insoluble fatty acid so as to remove the lime and leave the bichromate of the alkali in solution.

2. The hereinbefore described process of manufacturing the bichromates of potash and soda which consists in producing a double chromate of lime and the alkali to be bichromated by calcining a mixture of chrome iron ore, lime and an oxygenated compound of the radical metal of such alkali; separating such double chromate from the other products of calcination by lixiviation, and finally treating the lixiviate with an insoluble fatty acid so as to remove the lime and leave the bichromate of the alkali in solution.

3. The hereinbefore described process of manufacturing the bichromates of potash and soda which consists in forming a solution of a double chromate of lime and the alkali to be bichromated and treating such solution with an insoluble fatty acid so as to remove the lime and leave the bichromate of the alkali in solution.

4. In the manufacture of alkaline bichromates, the hereinbefore described method of removing the lime from a solution of a double chromate of lime and an alkali which consists in passing the solution through a filter containing an insoluble fatty acid thereby causing the lime to combine with the acid so as to form a calcareous soap; drawing of the resultant solution of bichromate of the alkali from the filter and finally removing the lime from the filter by treating it with dilute hydrochloric acid.

5. In the manufacture of alkaline bichromates the hereinbefore described method of removing the lime from a solution of a double chromate of lime and an alkali which consists in treating such solution with an insoluble fatty acid so as to cause the lime to form with the acid a calcareous soap and finally separating the resultant solution of bichromate of the alkali from the calcareous soap and any uncombined acid.

In testimony whereof I have hereunto subscribed my name this 19th day of February, A. D. 1894.

MARC W. BEYLIKGY.

Witnesses:
SARAH A. BUTLER,
PATRICK KEEVINS.